W. H. GOODMAN AND E. A. HOLDEN.
STEERING TRUCK.
APPLICATION FILED DEC. 26, 1916.
1,317,649. Patented Sept. 30, 1919.
2 SHEETS—SHEET 1.
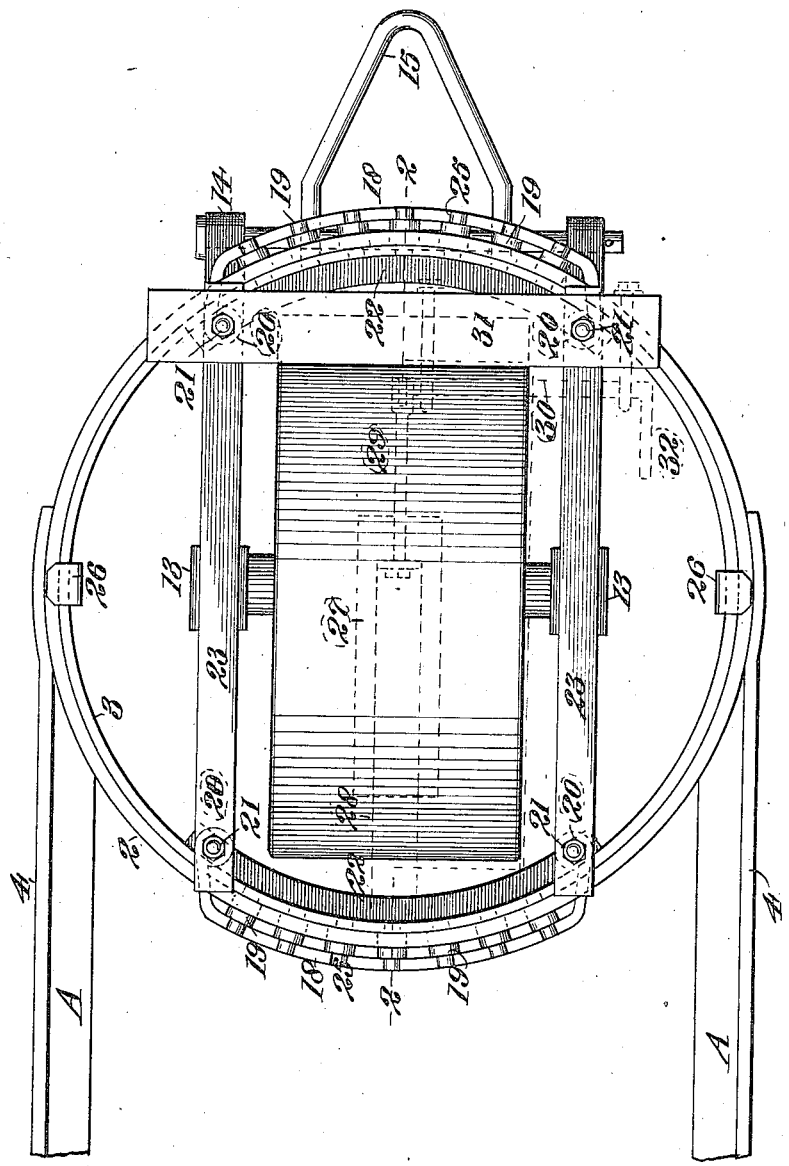
WITNESSES:
Charles Pickles
Thos Castberg
INVENTORS
Wade H. Goodman
Ernest A. Holden
BY Strong & Townsend
ATTORNEYS

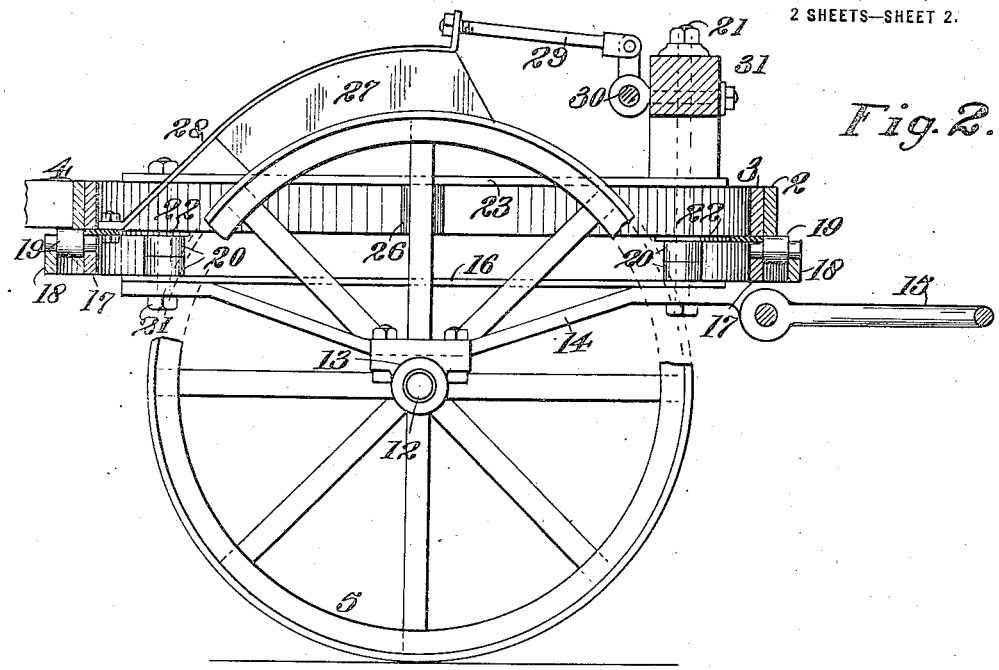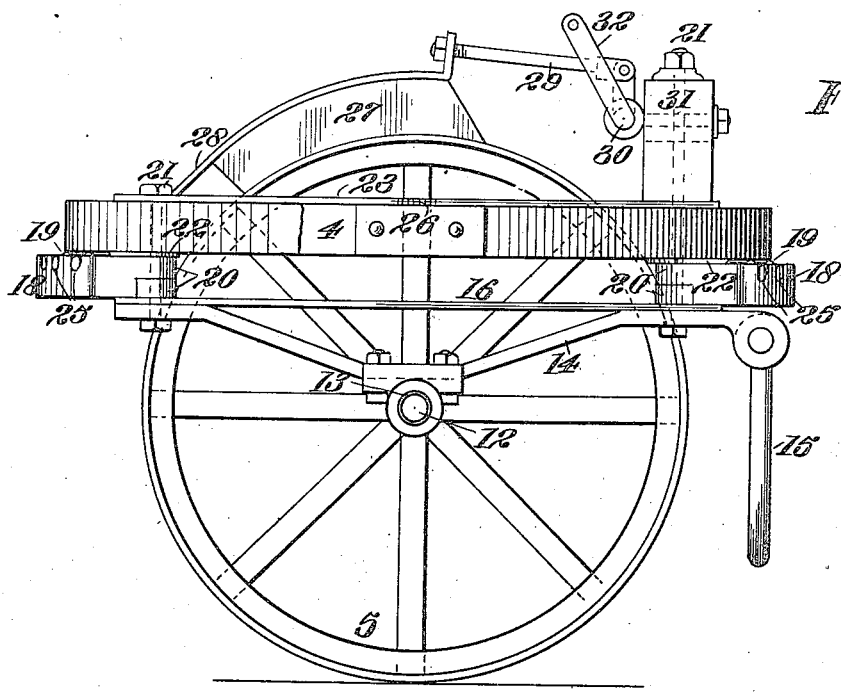

UNITED STATES PATENT OFFICE.

WADE H. GOODMAN AND ERNEST A. HOLDEN, OF SPOKANE, WASHINGTON, ASSIGNORS TO THE HOLT MANUFACTURING COMPANY, OF STOCKTON, CALIFORNIA, A CORPORATION OF CALIFORNIA.

STEERING-TRUCK.

1,317,649.      Specification of Letters Patent.    Patented Sept. 30, 1919.

Application filed December 26, 1916. Serial No. 138,771.

*To all whom it may concern:*

Be it known that we, WADE H. GOODMAN and ERNEST A. HOLDEN, citizens of the United States, residing at Spokane, in the county of Spokane, and State of Washington, have invented new and useful Improvements in Steering-Trucks, of which the following is a specification.

This invention relates to steering trucks and pertains especially to a front wheel roller turntable for combined harvesters and similar vehicles of great weight and draft and operating in soft ground or uneven ground.

The object of the invention is to permit the front truck wheel or truck wheels to turn easily for steering the vehicle and to allow a sufficient amount of flexibility in a lateral direction between the truck and vehicle frame, whereby to prevent digging in of the truck wheel when turning, with the superposed load slightly off balance, as when the vehicle is on a side hill or is overweighted on one side.

This object is accomplished by the provision of an improved and simplified turntable between the truck and vehicle frame, comprising an inner ring carried by the truck and fitted with antifriction rollers at the front and rear sectors only, and an outer ring carried by the vehicle frame telescopically receiving the inner ring and supported at its front and rear sectors on said rollers, and other features of construction which will become apparent upon a further understanding of the invention.

One form which this invention may assume is exemplified in the following description and illustrated in the accompanying drawings, in which—

Figure 1 shows a plan view of the steering truck and a portion of the connected vehicle.

Fig. 2 shows a vertical, sectional view of the same, taken on the line 2—2 of Fig. 1.

Fig. 3 shows a side elevation of the same.

In the drawings we show the side sills A of a combined harvester frame to the front end of which the steering truck and turntable attachment constituting the invention, is applied. 2 and 3 are a pair of concentric turntable rings; the outer ring 2 being rigidly connected with sills A by suitable means, as the bar extension pieces 4. Ring 3 is free within certain limitations to turn in the fixed ring 2. The invention resides in the mounting of ring 3 and the steering wheel 5. Steering wheel 5 has an axle 12 journaled in bearings 13 carried by the inverted arched supporting truss bars 14, formed in the lower portion of the truck frame; the front end of the truss bar being extended for the connection of a draft coupling 15, for attachment of the harvester to the traction engine, or other motive power.

16 represent the chords of the truss members 14 which are connected cross-wise at the front and rear by corresponding pairs of arcuate bars 17—18; which are arranged concentric with the turntable rings 2—3, and constitute bearings for the antifriction rollers 19; the upper edges of the bars 17—18 being suitably notched at 25 to receive the pintles of anti-friction rollers 19 on which the outer fixed turntable ring 2 rests; the under edge of said ring 2 forming a track-way against which the rollers 19 may run when steering the vehicle. The ends of the bars 17—18 are bent inwardly toward the turntable rings and provided with eyes 20, for the passage of the tie bolts 21 by which the component parts of the turntable making up the truck frame, are held together; these bolts 21 passing through the ends of the trusses 14, chords 16, eyes 20, overlying segmental plates 22 and fore and aft extending bars 23, the ends of which latter rest upon the inner ring 3 and extend beyond, with a slight clearance space below the outer turntable ring 2. The segmental flat bars or plates 22 underlie the inner turntable ring 3 and bridge the pockets 25 that are formed in the inner segments 17, and which pockets provide bearings for the inner series of pintles of the anti-friction rollers 19. Clips 26 may be fixed to the inner ring to project over the upper edge of the outer ring. Thus we see that the turntable truck is made up of the chords 16 with their trusses 14, the front and rear segments 17—18, with their anti-friction rollers 19, corresponding segmental plates 22 and overlying inside ring 3, the upper clamp bars 23 and four bolts 21 clamping and holding the parts into a rigid unitary structure; the rollers 19 extending radially and beyond the inner ring 3 to underlie and support the outer ring 2. The clamp bars 23 projecting as they do over the outer ring 2, prevent the turntable and its parts from dropping out of the outer ring 2 in case the front wheel 5 passes into or over a hole, or in case the entire front part of the machine is lifted bodily upward. The clips 26 coöperate with the over-hanging ends of the clamp bars 23 in this function and at the same time they prevent excessive rocking or lateral motion of the truck in the turntable.

The truck wheel 5 is thus free to turn about the center of the turntable rings as a vertical axis. Inasmuch as frictional engagement between the turntable and the main frame is limited to the series of rollers 19 at front and rear, consequently turning is made easier than if the frictional contact were extended throughout the circumference of the turntable; and at the same time these limited points of support upon the rollers 19 and against the fixed ring 2 give a certain degree of flexibility in the steering truck connections that renders steering easier and prevents the wheel from digging into the ground and burying itself.

This construction is particularly advantageous with power driven harvesters where the motors are mounted on the front ends of the combined harvesters and where the machine works in very soft ground. In fact, it is advantageous wherever a considerable extra weight is placed on the front of the machine, and which without this attachment would require a considerable widening of the front steering wheel 5 in order to hold up the load and prevent the wheel from miring.

Where it is desirable to equip the steering wheel 5 with brake mechanism, particularly where a combined harvester is used on hilly land, a brake mechanism such as herein shown may be employed. This comprises a block shoe 27 carried by a resilient bar 28 fixed to the rear arcuate plate 22 and connecting rod 29 running to its rock shaft 30 journaled on a transverse supporting beam 31, which overlies the front ends of the two clamp bars 23, and is held thereto and as a part of the rigid structure by the long front bolts 21. Rock shaft 30 carries a brake arm 32 by which the brake is operated from any suitable point; the brake turning in unison with the turntable mechanism.

It is obvious that various changes may be made in the details of construction without departing from the principle of the invention.

Having thus described our invention, what we claim and desire to secure by Letters Patent is—

1. In combination with a vehicle frame, a front steering truck comprising a wheeled axle, a draft connection therefor, relatively turnable inner and outer cylindrical rings surrounding the upper portion of the truck wheel, one carried by the vehicle frame and the other by the truck, the latter serving as a sole guide for the vehicle ring and acting to transmit the draft forces thereto, arcuate bars secured to the truck and concentric to said ring, and rollers carried by the truck and said arcuate bars and engaging beneath the vehicle ring for supporting the latter.

2. In combination with a vehicle frame, a front steering truck comprising a wheeled axle, a draft connection therefor, relatively turnable inner and outer cylindrical rings surrounding the upper portion of the truck wheel, one carried by the vehicle frame and the other by the truck, the latter serving as a sole guide for the vehicle ring and acting to transmit the draft forces thereto, arcuate bars secured to the trucks and supported in spaced concentric relation to said ring, rollers carried by the truck and said bars and engaging beneath the vehicle ring for supporting the latter, said rings having their upper edges flush with each other, and means fixed to the truck ring and projecting over the top of the vehicle ring to prevent axial movement of the two rings relatively.

3. In combination with a vehicle frame and a steering truck therefor, curved bars at the front and rear of the truck frame in arcs struck from the vertical turning axis of the truck, antifriction rollers carried by said arcuate bars, and a ring member fixed to the frame of the vehicle and resting turnably upon said rollers.

4. In combination with a vehicle frame, a steering truck therefor, comprising a wheel, laterally spaced fore and aft extending supporting bars fixed upon the axle of said wheel, a roller-carrying frame extending between adjacent ends of opposite supporting bars and curved in an arc about the vertical turning axis of the wheel, antifriction rollers carried by said roller-carrying frames, and a ring fixed to the vehicle frame and turnably supported upon said rollers.

5. In combination with a vehicle frame, a steering truck comprising a wheel, a frame on said wheel including laterally spaced fore and aft extending, inverted, arched bars fixed on the axle of the wheel intermediate their ends, arcuate members extending between adjacent ends of opposite arched bars, antifriction devices on the arcuate members, a guide ring adjacent to the antifriction devices and fixed upon the truck frame, and a ring fixed to the vehicle frame and adapted to telescopically receive said guide ring and rest turnably upon said antifriction devices.

6. In combination with a vehicle frame, a steering truck therefor comprising a wheel, laterally spaced fore and aft extending, inverted, arched bars supported intermediately their ends upon the axle of said wheel, tie members extending between the opposite ends of each of said arched bars, vertical bolts for connecting said arched and tie bars together, arcuate roller-carrying frames at the front and rear of the truck wheel extending between and secured in place by adjacent bolts on opposite arched bars, antifriction rollers carried by said arcuate frames, a ring member fixed to the truck frame and lying adjacent to said rollers, and a ring member on the vehicle frame telescopically receiving said first-mentioned ring and turnably supported upon said rollers.

7. In combination with a vehicle frame, a steering truck therefor comprising a wheel, laterally spaced fore and aft extending, inverted, arched bars supported intermediately their ends upon the axle of said wheel, tie members extending between the opposite ends of each of said arched bars, vertical bolts for connecting said arched and tie bars together, arcuate roller-carrying frames at the front and rear of the truck wheel extending between and secured in place by adjacent bolts on opposite arched bars, antifriction rollers carried by said arcuate frames, a ring member fixed to the truck frame and lying adjacent to said rollers, a ring member on the vehicle frame telescopically receiving said first-mentioned ring and turnably supported upon said rollers, and fore and aft extending bars secured in place by said vertical bolts, said bars being projected over said rings for retaining the same in place.

8. In combination, a vehicle frame and a steering truck therefor, said truck comprising a wheeled axle, inverted, arched supporting bars fixed upon the axle intermediate their ends and extending transversely of said axle, tie members connecting the opposite ends of each of said supporting bars, vertical bolts connecting the tie and supporting bars at their ends, a ring surrounding said bolts, means on said bolts for securing said ring in place, roller-carrying frames fixed to said bolts at the exterior of the ring, antifriction rollers on said carrying frames, and a ring fixed to the vehicle frame and telescopically fitted over said first-mentioned ring and resting turnably upon said rollers.

9. In combination, a vehicle frame and a steering truck therefor, said truck comprising a wheeled axle, inverted, arched supporting bars fixed upon the axle intermediate their ends and extending transversely of said axle, tie members connecting the opposite ends of each of said supporting bars, vertical bolts connecting the tie and supporting bars at their ends, a ring surrounding said bolts, means on said bolts for securing said ring in place, roller-carrying frames fixed to said bolts at the exterior of the ring, antifriction rollers on said carrying frames, a ring fixed to the vehicle frame and telescopically fitted over said first-mentioned ring and resting turnably upon said rollers, and a brake mechanism for the wheel of said axle secured in place on the truck frame by means of said vertical bolts.

10. A steering attachment for combined harvesters consisting in the combination with a main frame of a fixed turntable ring and a turntable therein comprising a steering wheel, fore and aft extending trusses with corresponding chords, anti-friction rollers having their axes radial to said turntable ring and underlying the lower edge of the turntable ring and supporting the same, with means carried by the said chords and trusses for supporting the anti-friction rollers, an inner turntable ring, clamp bars resting on the inner turntable ring and overlying the outer turntable ring, with bolts passing through the trusses, chords and clamp bars to hold the parts rigidly together.

11. A steering attachment for combined harvesters consisting in the combination with a main frame of a fixed turntable ring and a turntable therein comprising a steering wheel, fore and aft extending trusses with corresponding chords, anti-friction rollers having their axes radial to said turntable ring and underlying the lower edge of the turntable ring and supporting the same, with means carried by the said chords and trusses for supporting the anti-friction rollers, an inner turntable ring, clamp bars resting on the inner turntable ring and overlying the outer turntable ring, with bolts passing through the trusses, chords and clamp bars to hold the parts rigidly together, and brake mechanism for said wheel mounted on and carried by the turntable mechanism.

In testimony whereof we have hereunto set our hands in the presence of two subscribing witnesses.

WADE H. GOODMAN.
ERNEST A. HOLDEN.

Witnesses:
MARTHA DOUGLES,
BEN. C. HOLT.